July 14, 1970

R. PITTMAN 3,520,199

ACCELEROMETER

Filed June 28, 1966

INVENTOR.
ROLAND PITTMAN
BY
ATTORNEY

July 14, 1970 R. PITTMAN 3,520,199
ACCELEROMETER
Filed June 28, 1966 2 Sheets-Sheet 2

INVENTOR.
ROLAND PITTMAN
BY
ATTORNEY

United States Patent Office 3,520,199
Patented July 14, 1970

3,520,199
ACCELEROMETER
Roland Pittman, Caledonia, Mich., assignor, by mesne assignments, to Northrop Corporation, Palos Verdes, Calif., a corporation of California
Filed June 28, 1966, Ser. No. 561,127
Int. Cl. G01p 15/08
U.S. Cl. 73—517                                    2 Claims

ABSTRACT OF THE DISCLOSURE

A gyroscopic acceleration-responsive device in which piezoelectric electric sensors support the proof mass of the gyroscope through pivotal mountings in an enclosing structure. The sensors are orthogonally arranged and so poled as to provide output signals only in response to forces acting radially upon the structure.

---

This invention relates to a gyroscopic instrument and more particularly to accelerometer apparatus for monitoring acceleration characteristics of the proof mass of such an instrument.

An object of this invention is to provide an improved accelerometer for a gyroscope wherein radially disposed crystal devices support the proof mass and instrument inertial reactions of the mass.

Another object of this invention is to provide an improved accelerometer wherein instrumentation is performed in two orthogonal sensing axes thereby to provide complete directional indication of acceleration forces directed perpendicularly to the spin axis of the gyroscope.

Still another object of the invention is to provide an accelerometer wherein the crystals are radially mounted in welded pivotal joints, in order to provide a high order of compliance in all directions except the compression mode.

Yet another object of this invention is to provide an accelerometer which is characterized by improved performance in terms of cross coupling, isolation and scale factor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail, certain illustrative embodiments of the invention, these being indicative, however, of but several of the various ways in which the principles of the invention may be employed.

Figure 1:
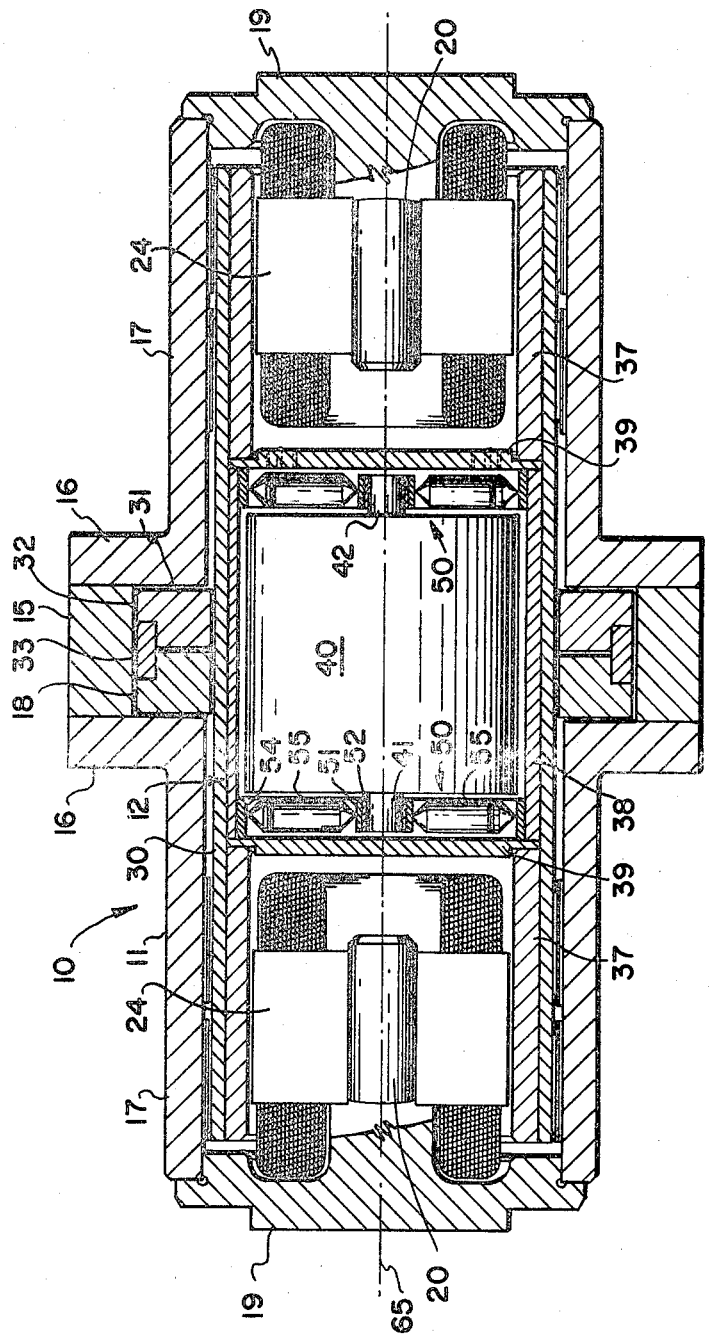
FIG. 1 is a partial cross sectional view of a gyroscope sensing device showing the relation of the accelerometer sensors to a gyroscope rotor and proof mass.

Referring now to FIG. 1, the gyroscope sensor 10 is composed primarily of an outer casing 11 and a gyroscopic rotor assembly 12, wherein the casing 11 is supported in a gyroscope (not shown) of any particular configuration and the rotor assembly 12 is rotated therein at high speeds to provide a stable inertial mass.

The casing 11 consists of an annular stator section 15 bonded by any suitable means to radially outwardly flanged skirts 16 of two oppositely extending tubular end bells 17, thus to provide a cylindrical cavity with a recessed center portion 18. End plates 19 carrying centrally located stub shafts 20 serve to close the ends of the cylindrical cavity and may also seal the cavity for retention of fluids. The stator windings 24 of a hysteresis spin motor 25 for imparting rotation to the rotor assembly 12 are supported on the stub shafts 20 at either end within the cylindrical cavity.

In a typical gyroscope the casing assembly 11 may be gimballed for movement about a plurality of axes dependent upon the number of degrees of freedom desired, however, for purposes of this invention, the casing assembly 11 will be considered independently since the only movement of importance in understanding the operation of this invention is the relative movement between the casing 11 and the rotor assembly 12.

The rotor assembly 12 consists of a tubular sleeve 30 centrally located within the casing assembly 11, a spaced distance therefrom in a hydrodynamic gas bearing suspension system to be more fully explained hereinafter. The tubular sleeve 30 provides the main support for the rotor assembly components and the interaction of fluid between the outer periphery of the tubular sleeve 30 and the inner periphery of the casing 11 provides the radial support for the rotor assembly 12. An annular member 31 of rectangular cross section is affixed on the exterior of the tubular sleeve 30 at a central location and is received in the notch 18 in the cylindrical cavity of the casing 11 at a spaced distance therefrom to provide for axial fluid support for the rotor assembly 12. Received in a notch 32 in the outer periphery of the annular member 31 is a ring 33 of magnetic material which is the rotor of a reference spin velocity generator. The outer periphery of the annular member 31 and the magnetic ring 33 and the inner periphery of the annular stator section 15 of the casing 11 also provide co-acting surfaces for fluid contained therebetween and are a part of the radial suspension system for the rotor assembly 12.

Tubular sleeves 37 in frictional contact with the inner periphery of the tubular rotor sleeve 30 at either end thereof and disposed radially inwardly, form the hysteresis rotors for the spin motor assembly. A rotating magnetic field developed in the stator windings 24 from an external power source (not shown) introduces a reaction force in the sleeves 37 thereby imparting motion to the rotor sleeve 30 and to the rotor assembly 12 of the gyroscope sensor 10. Speed of rotation of the rotor assembly 12 is dependent upon the frequency of excitation of the spin motor stator windings 24 and this may be any desired frequency from a few to many hundreds of cycles per second.

A spacer sleeve 38 and support discs 39 are mounted within the rotor sleeve 30, respectively concentrically and perpendicularly located therein to produce a rigid structure for the rotor assembly 12 and to support lead wire interconnections.

A cylindrical member 40 is centrally located inside the rotor assembly 12, within the spacer sleeve 38 and the support discs 39. The member 40 is the proof mass for the gyroscope and comprises a high inertia member which, when spun at high rates of rotation, provides a stable mass for gyroscope applications well understood in the art. The member 40 may be an angular velocity sensing device such as that described in co-pending application of the same assignee, Ser. No. 452,703, filed May 3, 1965, now Pat. No. 3,359,806, entitled "Fluid Rotor Two-Axis Rate Sensor" to provide a multi-function sensor or other enclosure filled with a high density fluid to provide a fluid rotor for rate sensing applications and the like, however, for purposes of this disclosure, the cylindrical member 40 will be considered a solid mass having sufficient inertial characteristics to provide the proof mass for acceleration measurements. The cylindrical member 40 has a pair of shafts 41, 42 located on the radial axis thereof for support and for imparting rotation thereto. The cylindrical member 40 is supported at either end by accelerometer assemblies 50 which may be more clearly seen in FIG. 2. Each accelerometer assembly 50 has an inner hub 51 fixedly attached to the shafts 41, 42 of the cylindrical member 40 by a sleeve bond 52. An outer ring 54 is disposed within the spacer sleeve 38 at either end thereof and is retained for movement therewith by frictional contact. Four radially and orthogonally disposed sensors 55 are located between the outer ring 54 and the inner hub 51 of each accelerometer assembly 50. The sensors 55 are of cylindrical configuration and are bonded to conical end caps 60, the apexes 61 of which are welded respectively to the outer ring 54 and the inner hub 51. Although fixedly attached to the respective supports, the conical end caps 60, because of the point contact, provide a resilient pivotal mount for the sensors 55. Thus limited relative movement is possible between the outer ring 54 and the inner hub 51 in an axial and axially rotative manner dependent upon both the resiliency of the pivotal mount and the elongation under tension of the sensors 55. However, the pivotal mount provides a rigid structure for radial relative motions between the outer ring 54 and the inner hub 51, thereby to directly place the sensors 55 in compressive or tensive modes without any intermediate and extraneous pivotal motion factor. An insulative section may be located between each end of each sensor 55 and its respective pivotal end cap 60 to electrically isolate the sensor 55 and wire leads may be attached to each end of the sensors to provide a convenient arrangement for various interconnections. In this embodiment of the invention the inner end of each sensor 55 is directly connected to the conductive conical end cap 60 welded to the inner hub 51 for transmision of the electrical signal to the inner hub 51, and an insulative section 64 is located between the outer end of the sensor 55 and the end cap 60.

Thus when the rotor sleeve 30 is placed in rotation by the spin motor 25, the rotation is transferred through the sensors 55 to the inner hub 51 and to the shafts 41, 42 of the cylindrical member 40 to thereby impart the same rotation to the proof mass of the gyroscope. The slight twisting tendency between the outer ring 54 and the inner hub 51 occurs only when changes in velocity of the rotor assembly 12 take place and vanishes when the rotor sleeve 30 and the proof mass have stabilized at the operating speed of the gyroscope. In a similar manner, axial movements of the proof mass relative to the rotor sleeve 30 occur when the gyroscope is subjected to an acceleration force directed along the spin axis 65 of the rotor assembly 12. Thus it is seen that the radial pivotal sensor mounting arrangement has provided a structure which is compliant in all directions except in the compressive mode of the sensors 55.

In this embodiment, the sensors 55 are piezoelectric compressive crystals which generate electric signals in response to the compressive or tensive forces applied thereto. Although the crystals are relatively rigid, slight changes in elongation occur when they are stressed, however, this change is microscopic in relation to the length of the crystal utilized in this assembly. The crystals operate in essentially a velocity mode, thus they do not produce an output voltage which is a measure of unique geometric position but rather produce a voltage which is proportional to the deviation in length to which the crystal is subjected by the compressive or tensive force. Thus steady-state deflections upon the crystal give no output but the signal is provided as a function of the rate and amplitude of the deviation of the length of the crystal.

Because the sensors 55 used in this invention are of the compressive type, they are relatively insensitive to bending type movements and produce relatively little signal output when operated in this mode. However, when the sensors 55 are subjected to the bending movements as when relative rotative movements in the same plane normal to the spin axis or axial movements between the outer ring 54 and inner hub 51 occur, it is seen that one side of each sensor 55 will be subjected to a compressive stress while the other side is subjected to a tensive stress of equal magnitude. This results in a zero net stress upon the sensor 55 in its responsive mode, and essentially a zero output signal, In the relative rotative and axial movement conditions, each of the sensors will also be placed in a tensive mode and signals will be emitted. However, since diametrically opposed sensors are oppositely connected in this embodiment as will be described more fully hereinafter, the signal produced by each sensor will be cancelled out by the oppositely phased signal from its diametric pair.

It can also be seen that even though the sensors 55 are in such a transient condition, subject to bending movement and common tensive forces, radially directed forces upon the proof mass will superimpose solely compressive or solely tensive forces on opposite sensors aligned with the force and produce an output in response thereto which is a sum of in-phase signals.

The sensors which are instantaneously perpendicular to the applied force will be practically insensitive thereto for similar reasons. The force tending to cause radial relative displacement between the outer ring 54 and inner hub 51 will create a bending stress and a tensive stress in each of the sensors 55 perpendicular to the line of force. No signals will occur from the bending tendency of the crystals and any signals caused by the tensive stress will occur identically in the diametrically opposed sensors, in out-of-phase relationship and will be cancelled out. It should be again emphasized that although it is shown that the accelerometer assembly 50 of the invention is effective in rejecting undesired signals due to the above-mentioned internal stresses and movements, some of these causative factors are relatively small. Although a piezoelectric crystal does change in size in response to an applied force, the change is small and is diminutive in relation to the movement allowed by the pivotal mounting of the crystals.

Thus it may be seen that the accelerometer assembly 50 of the invention provides a relatively rigid radial support for the proof mass thereby alleviating problems of imbalance and vibration in the radial plane of the gyroscope generated from within. This stiff mounting is also advantageous in its ability to transmit rate input torques which may be sensed within the proof mass itself, i.e., within a fluid rotor proof mass. The resilient characteristics of the pivotal mounting of the proof mass in the axial direction acts as a mechanical filter to eliminate rectilinear vibration, directed along the spin axis 65 and originating from outside the structure.

When the gyro rotor assembly 12 has attained an operating speed of rotation and the gyroscope sensor 10 is subjected to forces directed orthogonally to its spin axis 65, the casing 11 of the sensor will be caused to accelerate and move in response to the force carrying the rotor sleeve 30 with it through the expediency of the fluid suspension system. The proof mass, because of its high inertia, will resist the movement and will create a force directed oppositely thereto. This force will stress the crystal sensors 55, causing them to emit a signal related to that force. Since the rotor assembly 12, accelerometer assembly 50 and proof mass are spinning at some desired rate, the sensors 55 will become aligned with and perpendicular to said force at intervals dependent upon the spin rate of the rotor assembly 12. Thus the output of each sensor 55 will be a wave of alternating voltage whose amplitude is a function of the force applied and whose frequency is identical to the spin rate of the rotor assembly 12. When the sensors are aligned with the external force field, they undergo compressive and tensive changes, thereby emitting electrical signals, and when aligned perpendicularly to this force, will receive no effective compressive or tensive stress and thus will emit no signal as previously explained.

Figure 3:
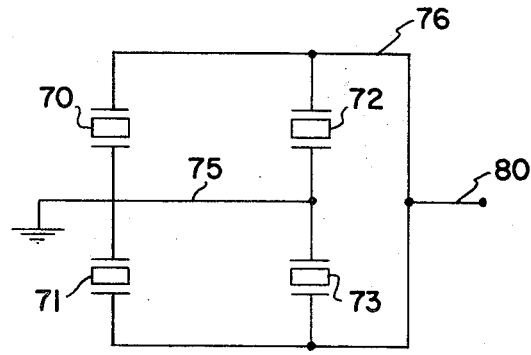
FIG. 3 is a schematic representation of one electrical interconnection for the accelerometer sensors.

Referring now to FIG. 3, there is shown an electrical schematic diagram of a typical interconnection of the sensors 55 of the accelerometer assemblies 50. Sensors 70 and 71 comprise a diametrically opposed pair of one accelerometer assembly and sensors 72 and 73 comprise a second diametrically opposed pair in the other accelerometer assembly, with all four sensors 70–73 in a common plane. Line 75 connected to one side of each of the sensors represents the inner hub 51 and line 76 represents a common connection for the leads from the outer ends of the sensors 70–73. Sensors 71 and 73 are poled so that when they are compressed they will emit a positive signal to line 76 and when tensioned, a negative signal to line 76. Sensors 70 and 72 are poled so that when they are tensioned they will emit a positive signal to line 76 and when compressed, a negative signal to line 76. Thus when under the influence of a radial force causing acceleration in the sensor plane, sensors 71 and 73 will be compressed and sensors 70 and 72 will be tensioned simultaneously to emit positive signals to line 76 to produce a resultant positive output at terminal 80. After 180° of rotation of the rotor assembly 12, conditions will occur to produce a resultant negative output at terminal 80.

It is clearly seen that if a pair of sensors 70, 71 are simultaneously placed in tension, as in the condition where relative axial or rotative motion between outer ring 54 and inner hub 51 occur, sensor 71 will emit a negative signal to line 76 and sensor 70 will emit an equal positive signal to line 76, thereby cancelling each other and producing no resultant signal at terminal 80.

It is also clear that the sensors 55 may be interconnected in any desired manner other than that shown in FIG. 3. The sensors can be completely insulated from the pivotal end mounts 60 and lead wires from each end of the sensors 55 can be utilized to monitor the sensors individually or in any desired combination and phase.

In a similar manner, greater or fewer sensing axes may be utilized in each accelerometer assembly 50 so long as diametrically opposed pairs of sensors are employed to provide rejection of undesired common-mode signals. Thus even a single pair of sensors will provide aceleration information for any radially directed forces since the accelerometer is being continuously rotated. The orthogonal sensor assembly is advantageous however in providing a continuous and complete indication of acceleration characteristics since at least one pair of sensors is in a sensing mode at any one time. Dummy or unconnected crystals can also be utilized in the accelerometer structure to change the compliance characteristics or to provide a properly balanced assembly.

Figure 2:
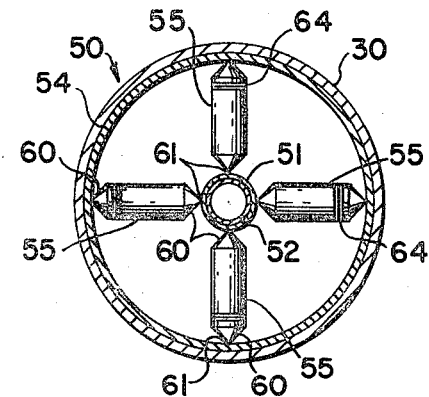
FIG. 2 is an end view of the gyroscope rotor showing the radial disposition of the accelerometer apparatus of the invention.
Figure 4:
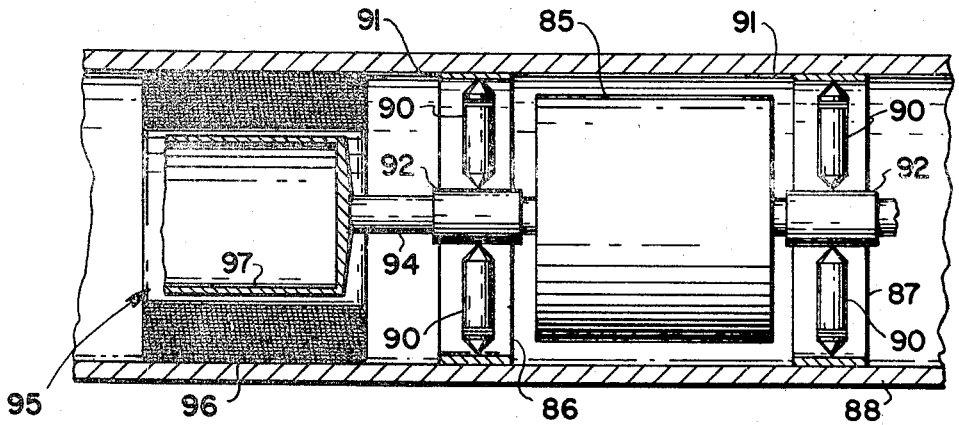
FIG. 4 is a cross sectional view of a second embodiment of the invention.

Arrangements other than that disclosed in FIGS. 1–3 are also possible. FIG. 4 shows such an embodiment of the invention, wherein a rotor 85 is journaled in accelerometer assemblies 86 and 87 for rotation within structure 88. The structure 88 may be of any suitable configuration and is subject to forces causing a radial acceleration as viewed in FIG. 4, thereby causing a relative movement between the rotor 85 and the structure 88. The sensors 90 are mounted at one end to the rings 91 affixed within the structure 88, and at the other end to bearing enclosures 92 for sleeve or ball bearings. The rotor 85 is supported on shaft 94 for rotation within the bearings 92 and is subject to the axial and radial movements similar to those described previously. A spin motor 95 is located within the structure 88 with stator winding 96 fixed to the structure 88 and a hysteresis rotor 97 fixed to the shaft 94 and displaced radially inwardly of the stator windings 96 to provide radial and axial clearance. When the structure 88 is subjected to forces causing acceleration, there will be relative movement between the rotor 85 and the structure 88 causing tension and compression in diametrically opposed sensors 90, depending on the direction of force. Although only a single pair of sensors 90 is shown in FIG. 4, it should be understood that two pair of sensors may be used in an orthogonal arrangement in each accelerometer assembly.

Thus the apparatus of the invention has provided a structure which is relatively resilient in the axial direction and rigid in the radial direction. Thus measurements made in the radial plane may be obtained with a minimum of extraneous factors and vibrations in the axial direction because of the cut-off effect of the accelerometer assembly which is similar to a mechanical filter will not be superimposed upon rate torque and the like signals which may be generated in a rotor of a gyro.

Other modes of applying the principle of the invention may be employed, change being made as regards the details described, provided the features stated in any of the following claims or the equivalent of such be employed.

I, therefore, particularly point out and distinctly claim as my invention:

1. In sensing apparatus for measuring radial acceleration which includes a rotatable structure, means for rotating said structure about a predetermined axis and a proof mass disposed coaxially within and relative to said structure, the combination of a system for supporting said proof mass and for sensing forces acting upon said structure which comprises at least two oppositely radially extending and relatively rigid support means disposed at each end of said proof mass connecting said proof mass to said structure, each support means including pivot means maintaining said proof mass and said structure in relative compliant axial relationship, each support means also including piezoelectric elements whereby motion of said proof mass relative to said structure produces a change of stress in said piezoelectric elements and means electrically interconnecting said piezoelectric elements, whereby diametrically opposed piezoelectric elements are connected so that only forces producing a compression of one element and a tension of the opposed element produces a net electrical output.

2. Apparatus as defined in claim 1 wherein said system for supporting said proof mass and for sensing forces acting upon said structure comprises four piezoelectric elements arranged in oppositely radially extending pairs and in coplanar relationship at each end of said proof mass, said means electrically connecting said elements being so arranged and said elements being so poled that axial movements due to angular velocity of said proof mass relative to said structure produce subtractive stresses in oppositely extending ones of said elements and zero net electrical output.

References Cited

UNITED STATES PATENTS

| 2,371,626 | 3/1945 | Kecskemeti | 310—8.4 |
| 2,638,556 | 5/1953 | Hausz | 310—8.4 |
| 2,878,006 | 3/1959 | Sedgfield | 73—517 |
| 3,191,445 | 6/1965 | Eklund | 73—71.2 |

JAMES J. GILL, Primary Examiner

H. GOLDSTEIN, Assistant Examiner